(12) United States Patent
Trantina (10) Patent No.: US 9,568,914 B1
(45) Date of Patent: Feb. 14, 2017

(54) REMOTELY CONTROLLED PULLEY TRANSPORT SYSTEM

(71) Applicant: Scott Trantina, Sioux Falls, SD (US)

(72) Inventor: Scott Trantina, Sioux Falls, SD (US)

( * ) Notice: Subject to any disclaimer, the term of this patent is extended or adjusted under 35 U.S.C. 154(b) by 0 days.

(21) Appl. No.: 15/004,350

(22) Filed: Jan. 22, 2016

Related U.S. Application Data (63) Continuation-in-part of application No. 14/336,478, filed on Jul. 21, 2014, which is a continuation-in-part of application No. 13/490,532, filed on Jun. 7, 2012, now Pat. No. 8,820,264.

(51) Int. Cl.
| | | |
|---|---|---|
| *B61C 11/02* | (2006.01) | |
| *B61B 3/00* | (2006.01) | |
| *G05D 1/00* | (2006.01) | |
| *B61B 12/02* | (2006.01) | |
| *A01K 5/02* | (2006.01) | |

(52) U.S. Cl.
CPC .............. *G05D 1/0022* (2013.01); *B61B 12/02* (2013.01); *B61C 11/02* (2013.01); *A01K 5/0266* (2013.01); *B61B 3/00* (2013.01)

(58) Field of Classification Search
CPC .... A01K 5/0266; A01K 39/014; A01K 39/01; A01K 39/0113; A01K 39/00; A01K 39/0125; A01K 5/0208; A01K 5/0258; G05D 1/0022; B61B 12/02; B61B 3/00; B61C 11/02
USPC .............. 119/57.92, 51.01, 52.1, 56.2, 57.2, 57.7,119/57.1; 104/89, 91, 93
See application file for complete search history.

(56) References Cited

U.S. PATENT DOCUMENTS

| | | | | |
|---|---|---|---|---|
| 2,316,463 A | | 4/1943 | Skulina | |
| 2,797,663 A | * | 7/1957 | Bailey ................... | A01K 39/01 119/57.6 |
| 3,550,812 A | * | 12/1970 | Brown ................. | A01K 5/0266 119/51.11 |
| 4,223,638 A | * | 9/1980 | Sappington .......... | A01K 5/0266 119/57.6 |
| 4,313,397 A | * | 2/1982 | Markum .............. | A01K 5/0266 104/89 |
| 4,981,107 A | * | 1/1991 | Beaudoin ............. | A01K 5/0208 119/56.2 |
| 5,297,503 A | | 3/1994 | Hibbard | |
| 5,309,864 A | * | 5/1994 | Harmsen .............. | A01K 5/0266 119/51.02 |
| 5,370,080 A | | 12/1994 | Koepp | |
| 5,392,732 A | | 2/1995 | Fry | |
| 5,438,956 A | | 8/1995 | Thigpen | |
| 5,868,101 A | | 2/1999 | Marshall | |

(Continued)

*Primary Examiner* — Yvonne Abbott-Lewis
(74) *Attorney, Agent, or Firm* — Jeffrey A. Proehl; Woods Fuller Shultz & Smith P.C.

(57) ABSTRACT

A remotely controlled pulley transport system may comprise a support line and a transport apparatus configured to be supported on the support line. The transport apparatus may comprise a platform including a housing, a first wheel rotatably mounted on the housing and configured to rest upon the support line, a propulsion device configured to rotate the first wheel to move the transport apparatus along the support line, a connection device mounted on the housing of the platform and configured to removably connect to an object to be transported by the transport apparatus with the connection device including a hook. The system may also include a control assembly configured to control operation of the transport apparatus remotely.

20 Claims, 9 Drawing Sheets

(56) References Cited

U.S. PATENT DOCUMENTS

| | | | |
|---|---|---|---|
| 6,532,895 B1 * | 3/2003 | Andersen | A01K 39/0125 |
| | | | 119/57.4 |
| 6,779,486 B2 * | 8/2004 | Vaags | A01K 61/02 |
| | | | 119/51.02 |
| 6,939,218 B1 | 9/2005 | Holland | |
| 8,820,264 B2 | 9/2014 | Trantina | |
| 2009/0020074 A1 | 1/2009 | Harman | |

* cited by examiner

REMOTELY CONTROLLED PULLEY TRANSPORT SYSTEM

CROSS REFERENCE TO RELATED APPLICATIONS

This application is a continuation-in-part of U.S. Utility patent application Ser. No. 14/336,478, filed on Jul. 21, 2014, which is a continuation-in-part of Utility patent application Ser. No. 13/490,532, filed on Jun. 7, 2012, each of which is hereby incorporated by reference in its entirety.

BACKGROUND

Field

The present invention relates to suspended remote controlled transport systems, including but not limited to systems used for transporting materials.

Description of Related Art

Remotely controlled stationary animal feed dispensers are known in the art. US Published Patent Application 20090020074 by Harmon, U.S. Pat. No. 5,868,101 to Marshall, U.S. Pat. No. 5,297,503 to Hibbard, U.S. Pat. No. 5,438,956 to Thigpen, U.S. Pat. No. 5,392,732 to Fry, and U.S. Pat. No. 5,370,080 to Koepp exemplify such stationary remotely controlled feed dispensers. Mobile animal feed dispensers are also known in the art. U.S. Pat. No. 2,316,463 to Skulina is typical of this class of feed dispenser.

One potential advantage of the present disclosure is the provision of a mobile and remotely controlled material transport.

SUMMARY

The radio controlled pulley comprises; a support line, a platform suspended from said support line, a propulsion system, said propulsion system configured to cause the platform to move along said support line and said propulsion system affixed to said platform, and an optional control system for commanding said propulsion system. The control system may be of a type which permits an operator to operate the radio controlled pulley from a point remote from the radio controlled pulley.

In one aspect, the disclosure relates to a remotely controlled pulley transport system that may comprise a support line and a transport apparatus configured to be supported on the support line. The transport apparatus may comprise a platform including a housing, a first wheel rotatably mounted on the housing and configured to rest upon the support line, a propulsion device configured to rotate the first wheel to move the transport apparatus along the support line, and a connection device mounted on the housing of the platform and configured to removably connect to an object to be transported by the transport apparatus. The connection device may include a hook. The system may also include a control assembly configured to control operation of the transport apparatus remotely.

In another aspect, the disclosure relates to a remotely controlled pulley transport system that may comprise a support line and a transport apparatus configured to be supported on the support line. The transport apparatus may comprise a platform including a housing, and a first wheel rotatably mounted on the housing and configured to rest upon the support line, with the first wheel being mounted on the housing in a position such that substantially an entirety of the housing is positioned on a first side of a vertical plane passing through the support line when the first wheel engages the support line. The transport apparatus may also include a propulsion device configured to rotate the first wheel to move the transport apparatus along the support line, and a connection device mounted on the housing of the platform and configured to removably connect to an object to be transported by the transport apparatus. The connection device may include a hook and a spacing member mounted on the housing with the hook mounted on the spacing member. The spacing member may extend outwardly from a side of the housing such that the hook is positioned on a second side of the vertical plane passing through the support line when the first wheel engages the support line. The system may also include a control assembly configured to control operation of the transport apparatus remotely.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

With reference now to the drawings, and in particular to FIGS. 1 through 9 thereof, a new remotely controlled pulley transport system embodying the principles and concepts of the disclosed subject matter will be described.

Figure 1:
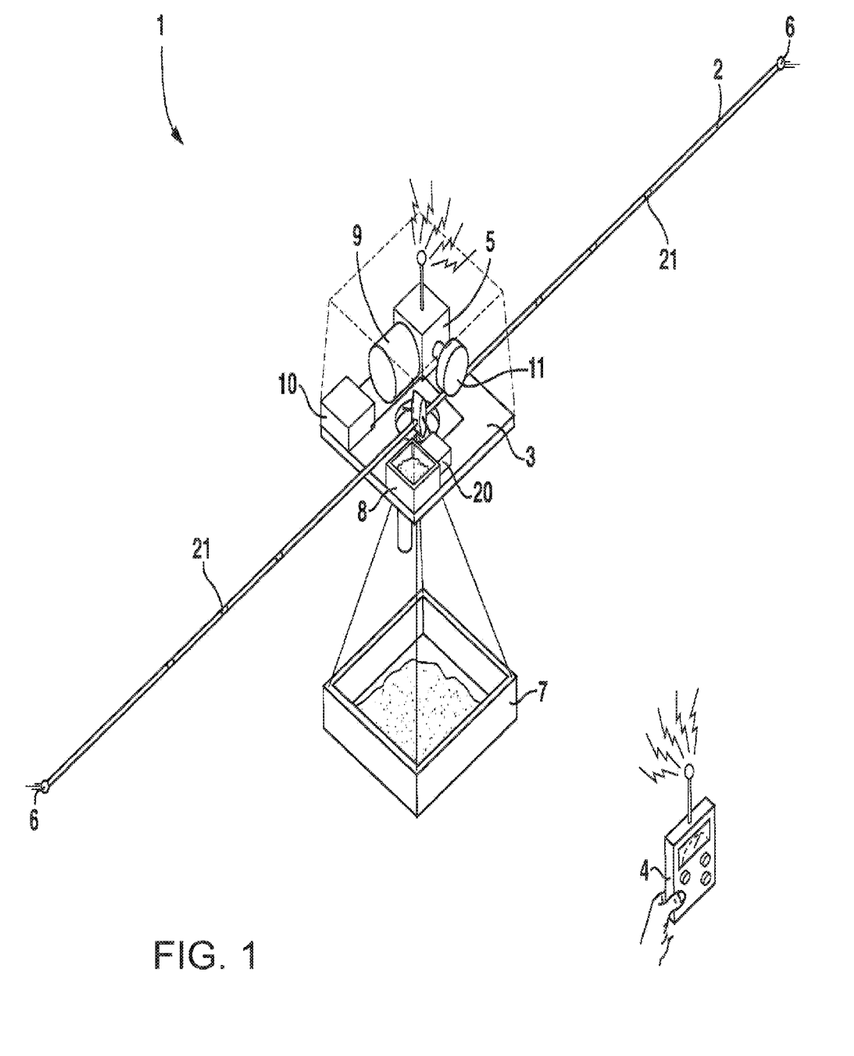
FIG. 1 is a schematic perspective view of an illustrative embodiment of the radio controlled pulley of the disclosure.
Figure 2:
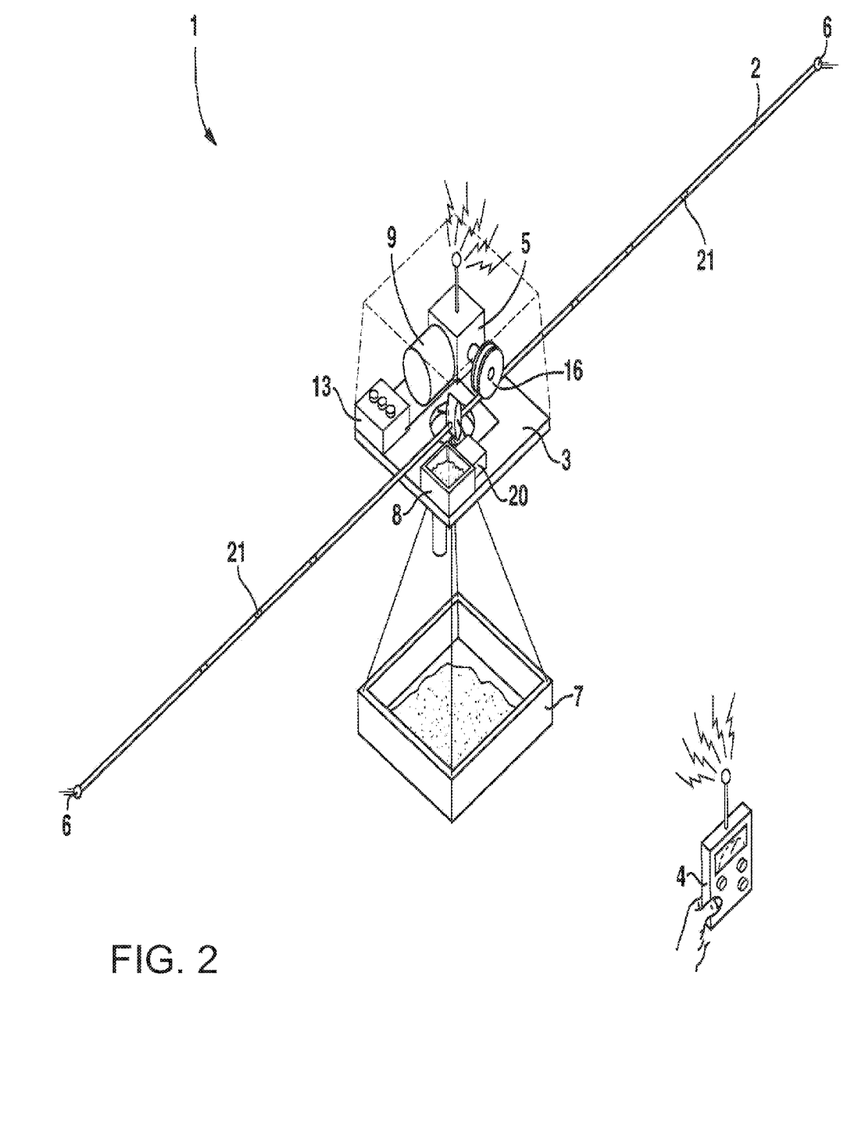
FIG. 2 is a schematic perspective view of an illustrative second embodiment of the disclosure.
Figure 3:
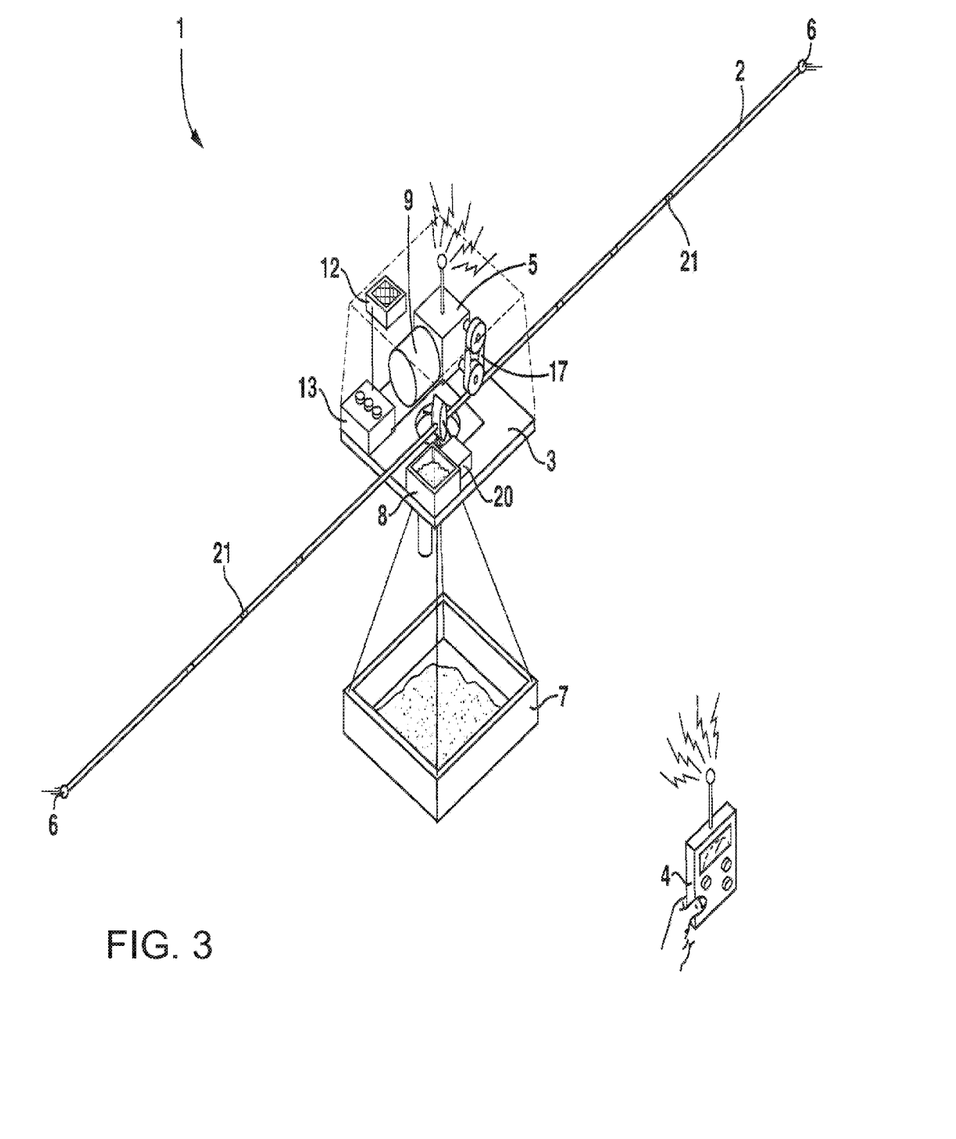
FIG. 3 is a schematic perspective view of an illustrative third embodiment of the disclosure.
Figure 4:
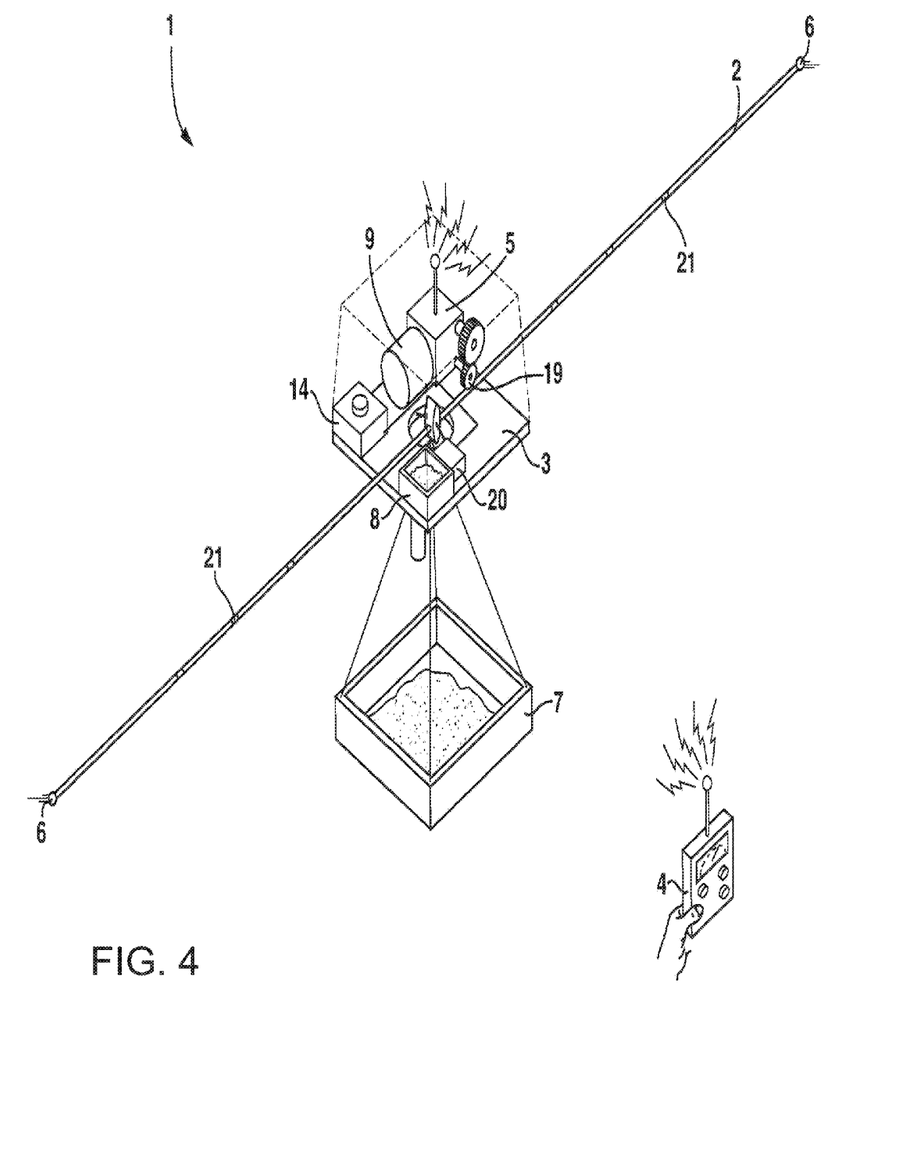
FIG. 4 is a schematic perspective view of an illustrative fourth embodiment of the disclosure.
Figure 5:
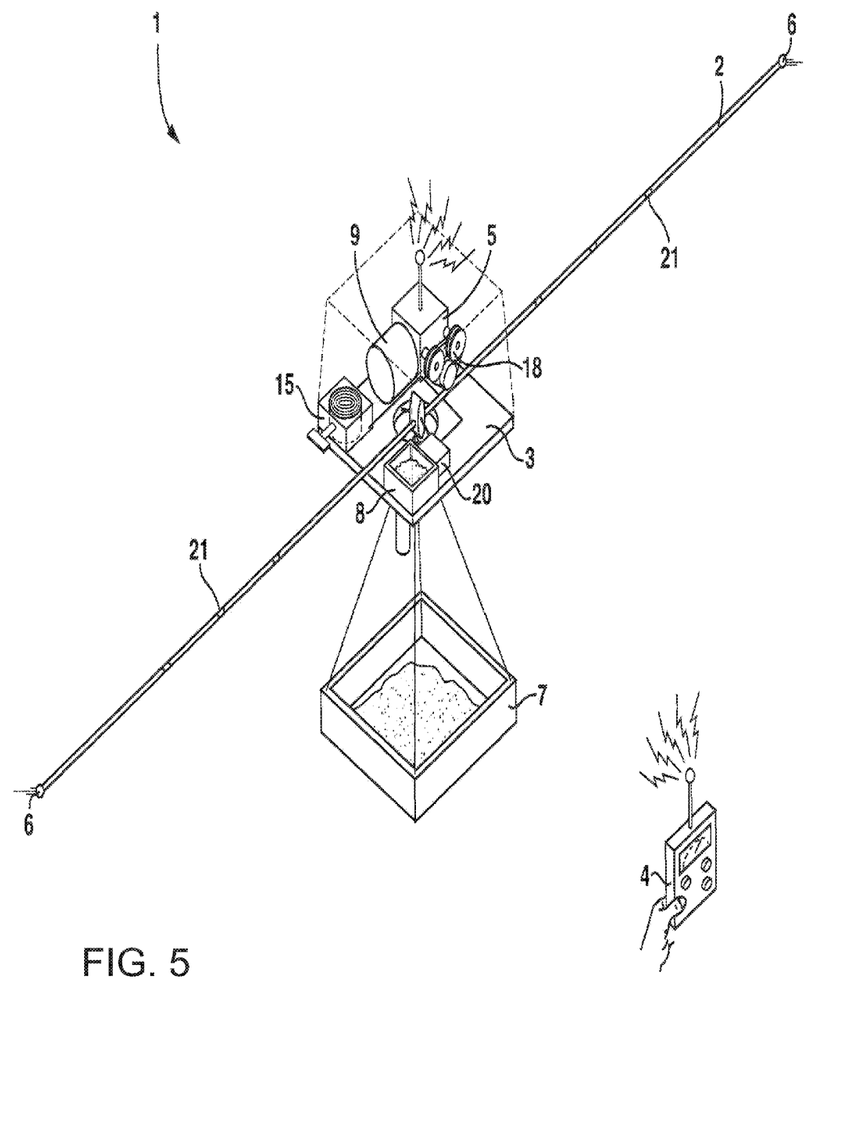
FIG. 5 is a schematic perspective view of an illustrative fifth embodiment of the disclosure.
Figure 6:
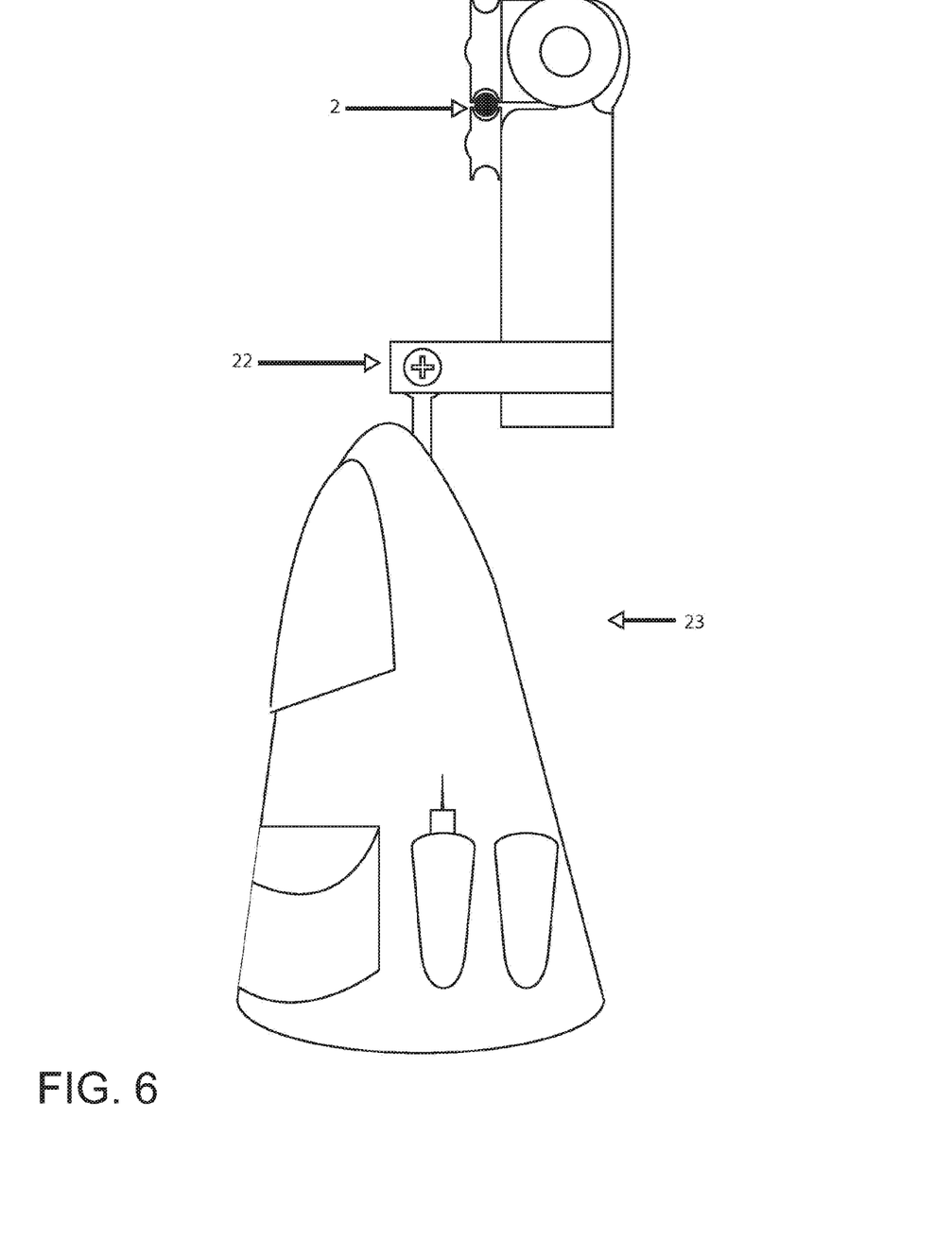
FIG. 6 is a schematic side view of an illustrative sixth embodiment of the disclosure shown supporting a tool belt.
Figure 7:
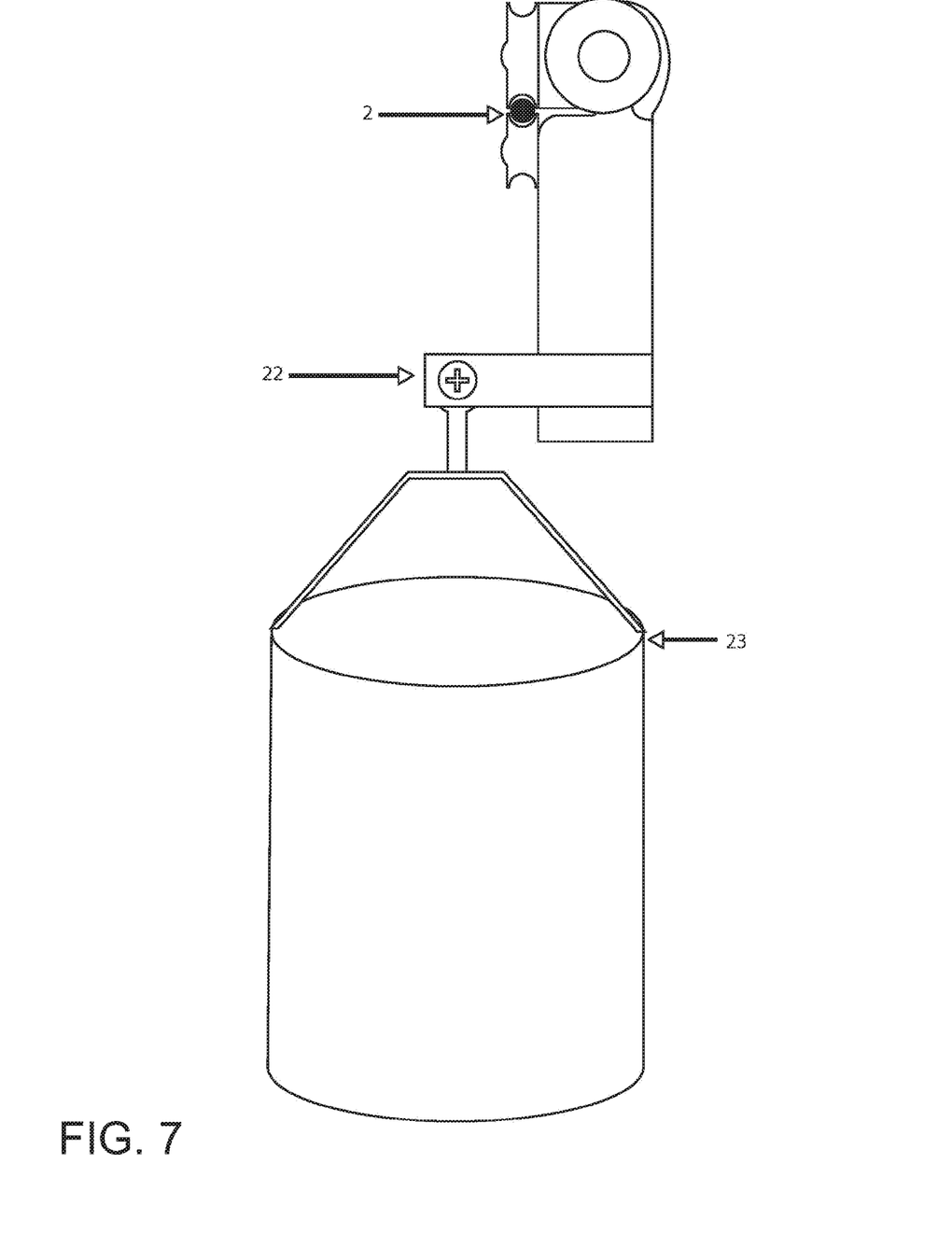
FIG. 7 is a schematic side view of the illustrative sixth embodiment of the disclosure shown supporting a bucket.
Figure 8:
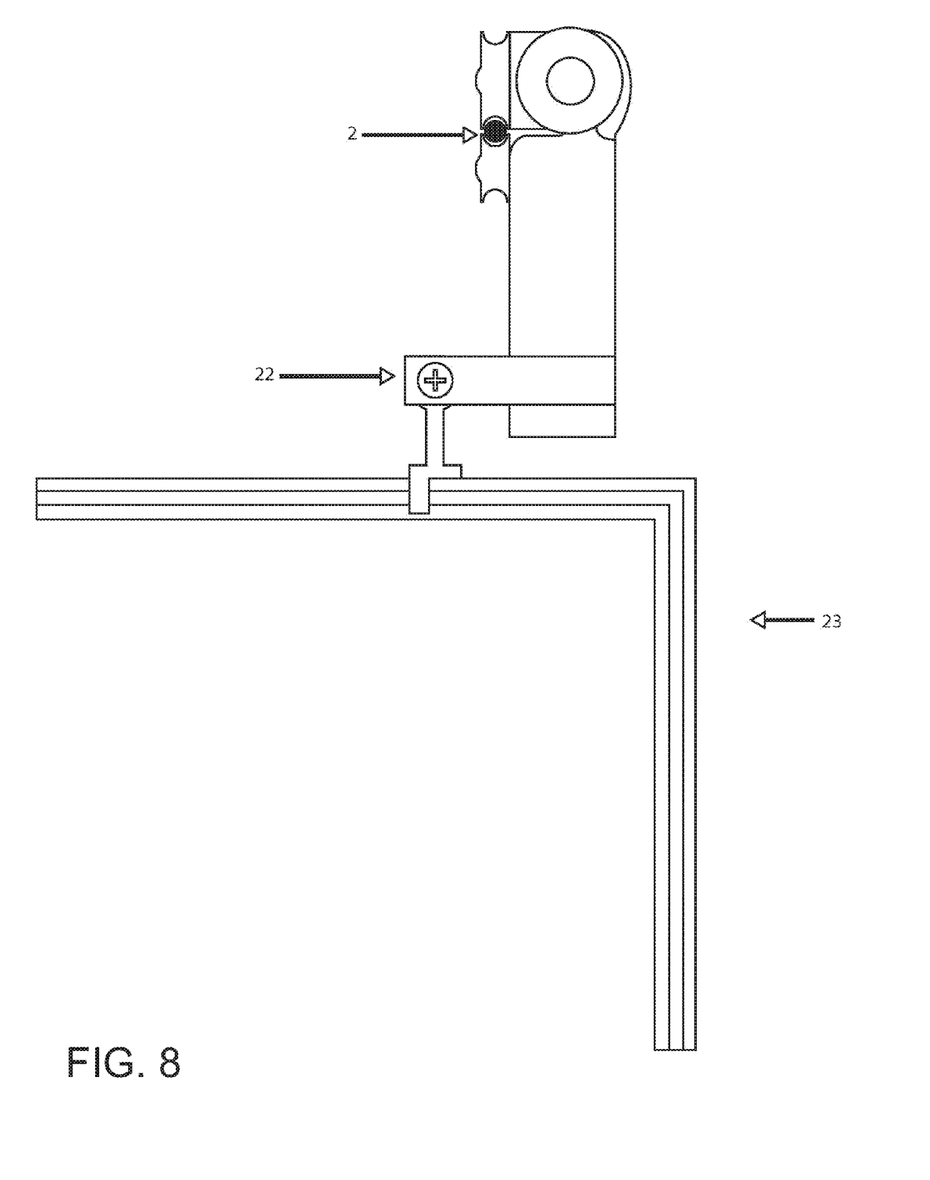
FIG. 8 is a schematic side view of the illustrative sixth embodiment of the disclosure shown supporting a piece of sheet material.

The radio controlled pulley 1 comprises; a support line 2, a platform 3 suspended from the support line 2, a propulsion system, The propulsion system 5 may be configured to cause the platform 3 to move along the support line 2 with the propulsion system 5 affixed to the platform 3, and a control system 4 for commanding the propulsion system 5.

The support line 2 may be of any material capable of flexibly stretching between at least two support points 6 and supporting the weight of the platform 3 and the components placed on the platform 3.

The platform 3 may be of any suitable shape and size required to accommodate a propulsion system 5 and a control system 4 for radio controlled pulley 1. To serve as a radio controlled pulley 1 the platform 3 must also accommodate a connection 22 for attaching items for transport 23. Items for transport 23 may be any item or items which may be attached to the connection 22. Items for transport 23 include, but are not limited to tool belts, buckets, and sheet materials.

The radio controlled pulley 1 may be further equipped with a television camera.

The propulsion system 5 comprises a motor 9, an energy storage system 10, a transmission system 11, and optionally a power supply 12. The motor 9 may be an internal combustion engine using a liquid or gaseous fuel such as gasoline, diesel fuel, propane or any fuel suitable to operate an internal combustion engine. The motor 9 may be an alternating current or direct current electric motor. The energy storage system 10 may be an electrical battery 13, or a tank 14 of an appropriate type for storing the liquid or gaseous fuel. In yet another embodiment the energy storage system 10 may be a wound spring 15. In short the motor 9 is any device which converts the energy stored in the energy storage system 10 to mechanical work used to propel the radio controlled pulley 1 along its support Line 2. The transmission is any mechanism which transmits mechanical energy from the motor 9 to the support line 2 to cause the radio controlled pulley 1 to move along the support line 2. In one embodiment the transmission system 11 would consist of a wheel 16 resting on the support line 2, connected by a drive belt 17 to a pulley 18 attached to and turned by the motor 9. In another embodiment the drive belt 17 and pulley 18 assembly would be replaced by a gear train 19. It will be recognized that there are a large number of ways by which the motor 9 can be connected to a drive wheel 16, or multiple drive wheels, to cause the radio controlled pulley 1 to move along the support line 2.

One or more tensioning wheels may be included on the side of the support line 2 to increase the friction between the drive wheels and the support line 2. One or more of the drive wheels and tensioning wheels may be provided with treads to increase their grip on the support line 2.

The optional power supply 12 is anything which captures or produces energy and supplies that energy to the energy storage system 10. In one embodiment this optional power supply 12 is a set of photo voltaic cells which supply energy to the electrical battery 13. In another embodiment the optional power supply 12 is an electrical battery charger which can be plugged into a convenient power source placed anywhere along the and sufficiently near the support line 2. It will be appreciated that this optional power supply 12 may take on many forms and can be envisioned for any of the energy storage systems 10 contemplated. This optional power supply 12 can be as simple as a slot to accommodate a winding key for the spring 15, as complex as photovoltaic cells to charge the electrical batteries, or anything in between.

The control system 4 may be of a preprogrammed type or of a type which can be managed while the radio controlled pulley 1 is remote from the operator. In both cases the control system 4 interacts with the motor 9, transmission system 11 or both to determine the direction and speed at which the motor 9 causes the radio controlled pulley 1 to move along the support line 2. The preprogrammed type provides a means for the operator to provide control instructions while the radio controlled pulley 1 is close at hand and the control system 4 then executes the instructions provided by the operator. The preprogrammed control system 4 may be as simple as an on-off switch, as complex as a programmable computer, or any level of complexity in-between. The remote control system 4 allows the operator to control the radio controlled pulley 1 via electromagnetic or acoustic waves.

Figure 9:
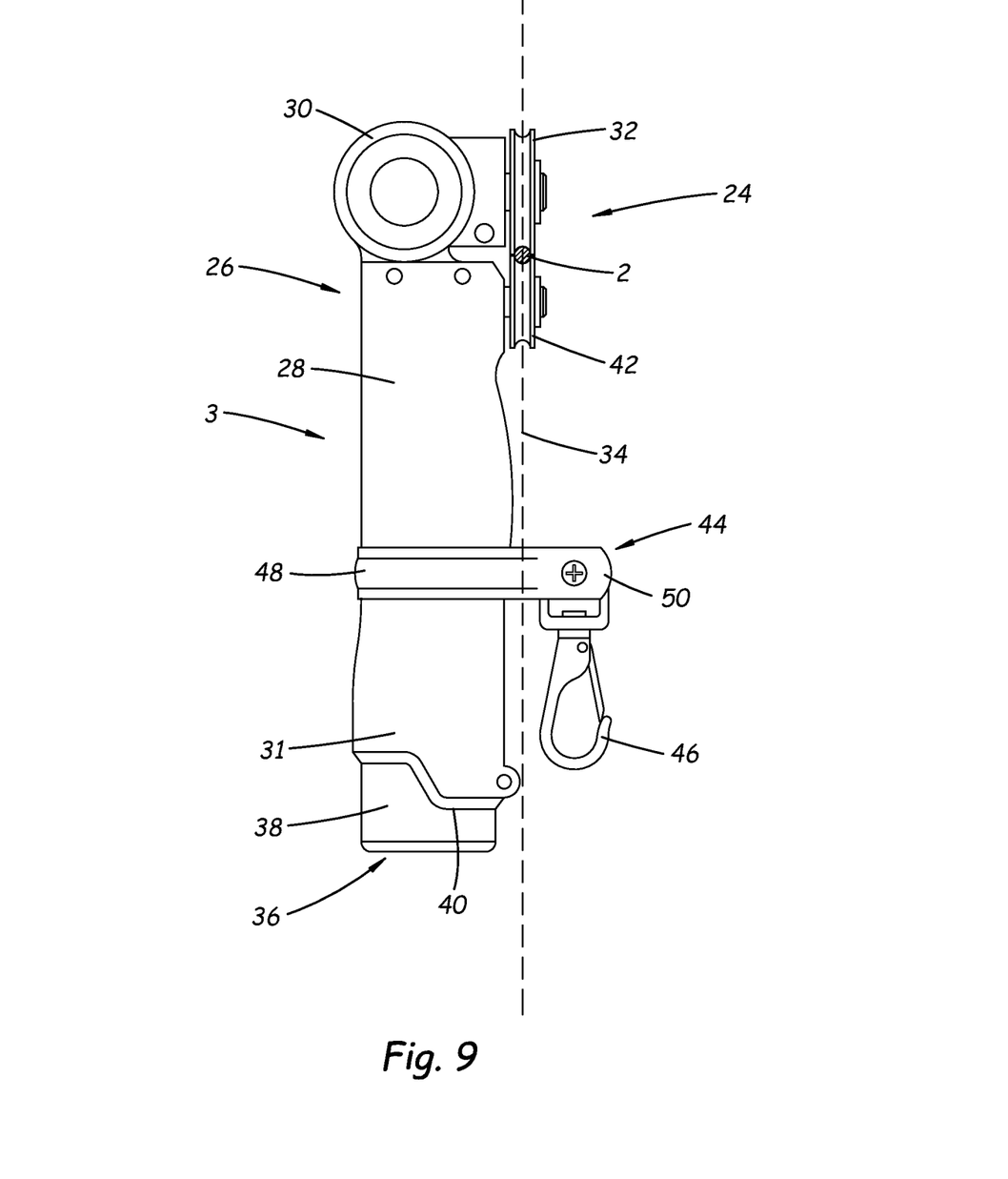
FIG. 9 is a schematic side view of an illustrative seventh embodiment of the disclosure showing a transport apparatus with a connection hook.

In other embodiments of the disclosure, such as shown in FIGS. 6 through 9 and in particular in FIG. 9, a remotely controlled pulley transport system 24 includes a support line 2 and a transport apparatus 26 which is configured to be supported on the support line 2, such as by suspension from the support line. The transport apparatus 26 may include a platform which may comprise a housing 28, and the housing may be elongated in shape with an upper end 30 and a lower end 31 when supported on the line 2. The housing 28 may include a first side and a second side, and the first side may be for positioning toward the support line 2 and the second side may be for positioning away from the support line. The housing may define an interior.

The transport apparatus 24 may also include a first wheel 32 which is mounted on the housing of the platform. The first wheel 32 may be configured to rest upon the support line. The first wheel 32 may function as a drive wheel and may comprise a sheave which may be removable to replace the wheel with perimeter grooves that are larger or smaller to accommodate various diameters of support line 2. Such replacement may be accomplished through the use of a quick connect structure between the wheel and the shaft on which the wheel is mounted. In some embodiments, the first wheel may be mounted on the housing 28 in a position such that substantially an entirety of the housing is positioned on a first side of a vertical plane 34 which passes through the support line when the first wheel engages the support line to suspend the housing from the line 2.

The transport apparatus 26 may also include a propulsion device 36 which is configured to move the transport apparatus along the support line. This propulsion device may be connected to the first wheel to rotate the first wheel and the propulsion device may comprise a motor, although other means for rotating the first wheel may be employed. The motor may be positioned in the interior of the housing and may also include a power supply. The power supply may comprise a battery 38, and in some embodiments the battery may be rechargeable and may also be removable from the housing. In some illustrative embodiments, the housing may define a battery cavity 40 for removably receiving the battery 38. The battery cavity 40 may extend into the housing at the lower end 31 of the housing, which may function to move the center of gravity of the apparatus toward the lower end of the housing.

The transport apparatus 26 may also include a second wheel 42 which is mounted onto the housing of the platform in a manner such that the support line is positionable between the first and second wheels. The second wheel may be positioned adjacent to the first wheel, but also may be spaced from the first wheel to thereby permit the support line to be positioned in a space between the first and second wheels. The second wheel may be mounted on the housing in a manner such that the second wheel is spring-biased toward the first wheel. In some embodiments, the second wheel 42 may have a diameter which is less than a diameter of the first wheel 32, and may also be removable to replace the second wheel with a wheel having a perimeter groove suited to the diameter of the support line being used with the transport apparatus.

The transport apparatus 26 may also include a connection device 44 which is mounted on the housing of the platform and may be configured to removably connect to an object to be transported by the transport apparatus. The connection device may comprise a hook 46 which may be mounted on the housing such that the hook is positioned on a second side of the vertical plane 34 passing through the support line 2 when the first wheel 32 engages the support line. The connection device 44 may also include a spacing member 48 which is mounted on the housing of the platform and may have the hook 46 mounted thereon. The spacing member 48 may extend outwardly from the first or front side of the housing and may have an outboard end 50 located away from the housing. The hook 46 may be mounted on the outboard end 50. The position of the spacing member 48 may be adjustable along a length of the elongated housing between the upper 30 and lower 31 ends of the housing. The spacing member may be positionable on the housing at a location that is located between the first wheel and the lower end of the housing, and in some of the most preferred embodiments, between the second wheel and the lower end.

The system 24 may also include a control assembly 4 which is configured to control operation of the transport apparatus. The control assembly may be configured to remotely control the apparatus operation. The control assembly 4 may include a receiver mounted on the transport apparatus and the receiver may include a receiver antenna. The control assembly 4 may also include a transmitter and the transmitter may include a transmitter antenna. The control assembly 4 may include a control housing and the transmitter may be incorporated into the control housing. The control housing may be separate from the transport apparatus and thus may be relatively freely movable with respect to the transport apparatus to provide the remote control aspects of the disclosure.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A remotely controlled pulley transport system comprising:
   a flexible support line;
   a transport apparatus configured to be supported on the support line, the transport apparatus comprising:
      a platform including a housing;
      a first wheel rotatably mounted on the housing and configured to rest upon the support line;
      a propulsion device configured to rotate the first wheel to move the transport apparatus along the support line;
      a connection device mounted on the housing of the platform and configured to removably connect to an object to be transported by the transport apparatus, the connection device including a hook; and
   a control assembly configured to control operation of the transport apparatus remotely.

2. The system of claim 1 wherein the first wheel is mounted on the housing in a position such that substantially an entirety of the housing is positioned on a first side of a vertical plane passing through the support line when the first wheel engages the support line.

3. The system of claim 2 wherein the hook is mounted on the housing such that the hook is positioned on a second side of the vertical plane passing through the support line when the first wheel engages the support line.

4. The system of claim 1 wherein the connection device includes a spacing member mounted on the housing and has the hook mounted thereon, the spacing member extending outwardly from a side of the housing.

5. The system of claim 4 wherein the spacing member has an outboard end away from the housing and the hook is mounted on the outboard end.

6. The system of claim 4 wherein a position of the spacing member is adjustable along a length of the elongated housing between the upper and lower ends.

7. The system of claim 1 wherein the propulsion device comprises a motor connected to the first wheel to drive the first wheel.

8. The system of claim 1 wherein the propulsion device includes a power supply, the power supply comprising a battery.

9. The system of claim 8 wherein the battery is removable from the housing.

10. The system of claim 9 wherein the housing defines a battery cavity for removably receiving the battery.

11. The system of claim 10 wherein the battery cavity extends into the housing at a lower end of the housing.

12. The system of claim 1 wherein a second wheel is mounted on the housing of the platform in a manner such that the support line is positionable between the first and second wheels.

13. The system of claim 12 wherein the first wheel and the second wheel are mounted on the housing of the platform toward an end of the housing located upper of another end of the housing when the transport apparatus is suspended on the support line.

14. A remotely controlled pulley transport system comprising:
a support line;
a transport apparatus configured to be supported on the support line, the transport apparatus comprising:
a platform including a housing;
a first wheel rotatably mounted on the housing and configured to rest upon the support line, the first wheel being mounted on the housing in a position such that substantially an entirety of the housing is positioned on a first side of a vertical plane passing through the support line when the first wheel engages the support line;
a propulsion device configured to rotate the first wheel to move the transport apparatus along the support line;
a connection device mounted on the housing of the platform and configured to removably connect to an object to be transported by the transport apparatus, the connection device including a hook and a spacing member mounted on the housing with the hook mounted on the spacing member, the spacing member extending outwardly from a side of the housing such that the hook is positioned on a second side of the vertical plane passing through the support line when the first wheel engages the support line; and
a control assembly configured to control operation of the transport apparatus remotely.

15. The system of claim 14 wherein a position of the spacing member is adjustable along a length of the elongated housing between the upper and lower ends.

16. The system of claim 14 wherein the propulsion device includes a battery removably mounted on the housing.

17. The system of claim 16 wherein the housing defines a battery cavity for removably receiving the battery, the battery cavity extending into the housing at a lower end of the housing.

18. A remotely controlled pulley transport system comprising:
a support line;
a transport apparatus configured to be supported on the support line, the transport apparatus comprising:
a platform including a housing;
a first wheel rotatably mounted on the housing and configured to rest upon the support line;
a propulsion device configured to rotate the first wheel to move the transport apparatus along the support line;
a connection device mounted on the housing of the platform and configured to removably connect to an object to be transported by the transport apparatus, the connection device including a hook; and
a control assembly configured to control operation of the transport apparatus remotely;
wherein the first wheel is mounted on the housing in a position such that substantially an entirety of the housing is positioned on a first side of a vertical plane passing through the support line when the first wheel engages the support line.

19. The system of claim 18 wherein the hook is mounted on the housing such that the hook is positioned on a second side of the vertical plane passing through the support line when the first wheel engages the support line.

20. The system of claim 18 wherein a second wheel is mounted on the housing of the platform in a manner such that the support line is positionable between the first and second wheels.

* * * * *